(12) United States Patent
Niwa (10) Patent No.: US 12,344,107 B2
(45) Date of Patent: Jul. 1, 2025

(54) CHARGING EQUIPMENT AND CONTROL METHOD OF CHARGING EQUIPMENT

(71) Applicant: TOYOTA JIDOSHA KABUSHIKI KAISHA, Toyota (JP)

(72) Inventor: Yamato Niwa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 700 days.

(21) Appl. No.: 17/726,627

(22) Filed: Apr. 22, 2022

(65) Prior Publication Data

US 2022/0388407 A1 Dec. 8, 2022

(30) Foreign Application Priority Data

Jun. 8, 2021 (JP) .................................. 2021-095666

(51) Int. Cl.
*B60L 53/16* (2019.01)
*B60L 53/35* (2019.01)

(52) U.S. Cl.
CPC ............... *B60L 53/16* (2019.02); *B60L 53/35* (2019.02)

(58) Field of Classification Search
CPC .................................. B60L 53/16; B60L 53/35
See application file for complete search history.

(56) References Cited

U.S. PATENT DOCUMENTS

2020/0006969 A1* 1/2020 Penilla .................... H04L 67/04

FOREIGN PATENT DOCUMENTS

| CN | 102044900 A | 5/2011 |
|----|-------------|--------|
| CN | 105809748 A | 7/2016 |
| JP | 2011109807 A | 6/2011 |
| JP | 5475407 B2 | 4/2014 |

* cited by examiner

*Primary Examiner* — Robert Grant
(74) *Attorney, Agent, or Firm* — Dinsmore & Shohl LLP

(57) ABSTRACT

A control device of a charging equipment executes a process including a step of determining whether or not a vehicle approaches a charging equipment, a step of determining, in a case where the vehicle approaches the charging equipment, whether or not the approaching vehicle is a non-target vehicle that is not a usage target of the charging equipment, a step of, in a case where the approaching vehicle is the non-target vehicle, elevating a movable portion, and a step of, in a case where the approaching vehicle passes the charging equipment, lowering the movable portion.

4 Claims, 6 Drawing Sheets

CHARGING EQUIPMENT AND CONTROL METHOD OF CHARGING EQUIPMENT

CROSS-REFERENCE TO RELATED APPLICATION

This application claims priority to Japanese Patent Application No. 2021-095666 filed on Jun. 8, 2021, incorporated herein by reference in its entirety.

BACKGROUND

1. Technical Field

The present disclosure relates to a charging equipment and to a control of movable charging equipment that charges an in-vehicle power storage device.

2. Description of Related Art

A charging equipment that charges a power storage device mounted on a vehicle is installed in an external parking lot or sidewalk of the vehicle, but since the charging equipment occupies an installation space, in some cases, the charging equipment hinders with walking or travel of the vehicle. Therefore, a technique of making the charging equipment movable and housing the charging equipment under the ground, for example, is known.

For example, Japanese Unexamined Patent Application Publication No. 2011-109807 (JP 2011-109807 A) discloses a charging pole installed to be configured to be elevated and lowered such that the charging pole can be put into a state of standing up from the ground and a state of being housed under the ground. The charging pole is provided with a socket, and when a user charges the power storage device mounted on the vehicle, a plug at an end portion of a charging cable is connected to the socket.

SUMMARY

A method of connection between a vehicle and a charging equipment that can be housed under the ground is not limited to the method disclosed in JP 2011-109807 A. As another method of connection between the vehicle and the charging equipment, for example, a method is considered in which a connector of the charging equipment is elevated and connected to an inlet provided at a lower portion of the vehicle in a state in which the vehicle is parked directly above the charging equipment housed under the ground. The charging equipment of such a method of connection can be used in a state in which the vehicle is parked in a predetermined parking position.

However, for example, in a case where a vehicle that is not a usage target of the charging equipment is parked at the predetermined parking position before the vehicle that reserves the use of the charging equipment and is the usage target of the charging equipment moves to the predetermined parking position, there is a possibility that the vehicle that is the usage target cannot move to the parking position and the power storage device mounted on the vehicle that is the usage target cannot be charged. Therefore, there is a possibility that the convenience of the user is deteriorated.

The present disclosure is to provide a charging equipment and a control method of the charging equipment that suppress the deterioration of the convenience of a user.

A first aspect of the present disclosure relates to a charging equipment that is installed in a recess portion formed under ground and is configured to charge a power storage device mounted on a vehicle. An inlet used for charging the power storage device is provided in a lower portion of the vehicle. The charging equipment includes a movable portion, an elevating device, and a control device. The movable portion has a connector configured to be connected to the inlet of the vehicle parked at a predetermined position. The elevating device is configured to elevate and lower the movable portion within a movable range including a first position at which the connector is housed under the ground and a second position at which the connector is connected to the inlet above the ground. The control device is configured to control an operation of the elevating device. The control device is configured to, in a case where a non-target vehicle that is not a usage target of the charging equipment approaches the charging equipment, elevate the movable portion from the first position.

As described above, in a case where the non-target vehicle that is not the usage target of the charging equipment approaches the charging equipment, the movable portion is elevated from the first position, so that it is possible to suppress parking of the non-target vehicle at the predetermined position. Therefore, it is possible to avoid a situation in which the vehicle that is the usage target of the charging equipment cannot be parked, so that it is possible to suppress the deterioration of the convenience of the user.

The control device according to the aspect of the present disclosure may be configured to, in a case where a target vehicle that is the usage target of the charging equipment approaches the charging equipment, when the target vehicle is parked at the predetermined position, elevate the movable portion from the first position to the second position.

As described above, in a case where the target vehicle that is the usage target of the charging equipment approaches the charging equipment, when the target vehicle is parked at the predetermined position, the movable portion is elevated from the first position to the second position, so that it is possible to charge the power storage device mounted on the target vehicle by connecting the connector to the inlet.

Further, the control device according to the aspect of the present disclosure may be configured to, in a case where the non-target vehicle passes the charging equipment, lower the movable portion to the first position.

As described above, in a case where the non-target vehicle passes the charging equipment, the movable portion is lowered to the first position, so that the target vehicle can be parked at the predetermined position thereafter.

Further, the control device according to the aspect of the present disclosure may be configured to, in a case where the non-target vehicle approaches the charging equipment, elevate the movable portion to a height that hinders parking of the non-target vehicle at the predetermined position.

As described above, in a case where the non-target vehicle that is not the usage target of the charging equipment approaches the charging equipment, the movable portion is elevated from the first position to the height that hinders parking of the non-target vehicle at the predetermined position, so that it is possible to suppress parking of the non-target vehicle at the predetermined position.

A second aspect of the present disclosure relates to a control method of the charging equipment that is installed in a recess portion formed under ground and is configured to charge a power storage device mounted on a vehicle. An inlet used for charging the power storage device is provided in a lower portion of the vehicle. The charging equipment includes a movable portion and an elevating device. The movable portion has a connector configured to be connected to the inlet of the vehicle parked at a predetermined position. The elevating device is configured to elevate and lower the movable portion within a movable range including a first position at which the connector is housed under the ground and a second position at which the connector is connected to the inlet above the ground. The control method includes a step of determining whether or not a non-target vehicle that is not a usage target of the charging equipment approaches the charging equipment, and a step of, in a case where the non-target vehicle approaches the charging equipment, elevating the movable portion from the first position.

According to the present disclosure, it is possible to provide the charging equipment and the control method of the charging equipment that suppress the deterioration of the convenience of the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the following, an embodiment of the present disclosure will be described in detail with reference to the drawings. In the figures, the same or corresponding parts are designated by the same reference signs and the description thereof will not be repeated.

Figure 1:
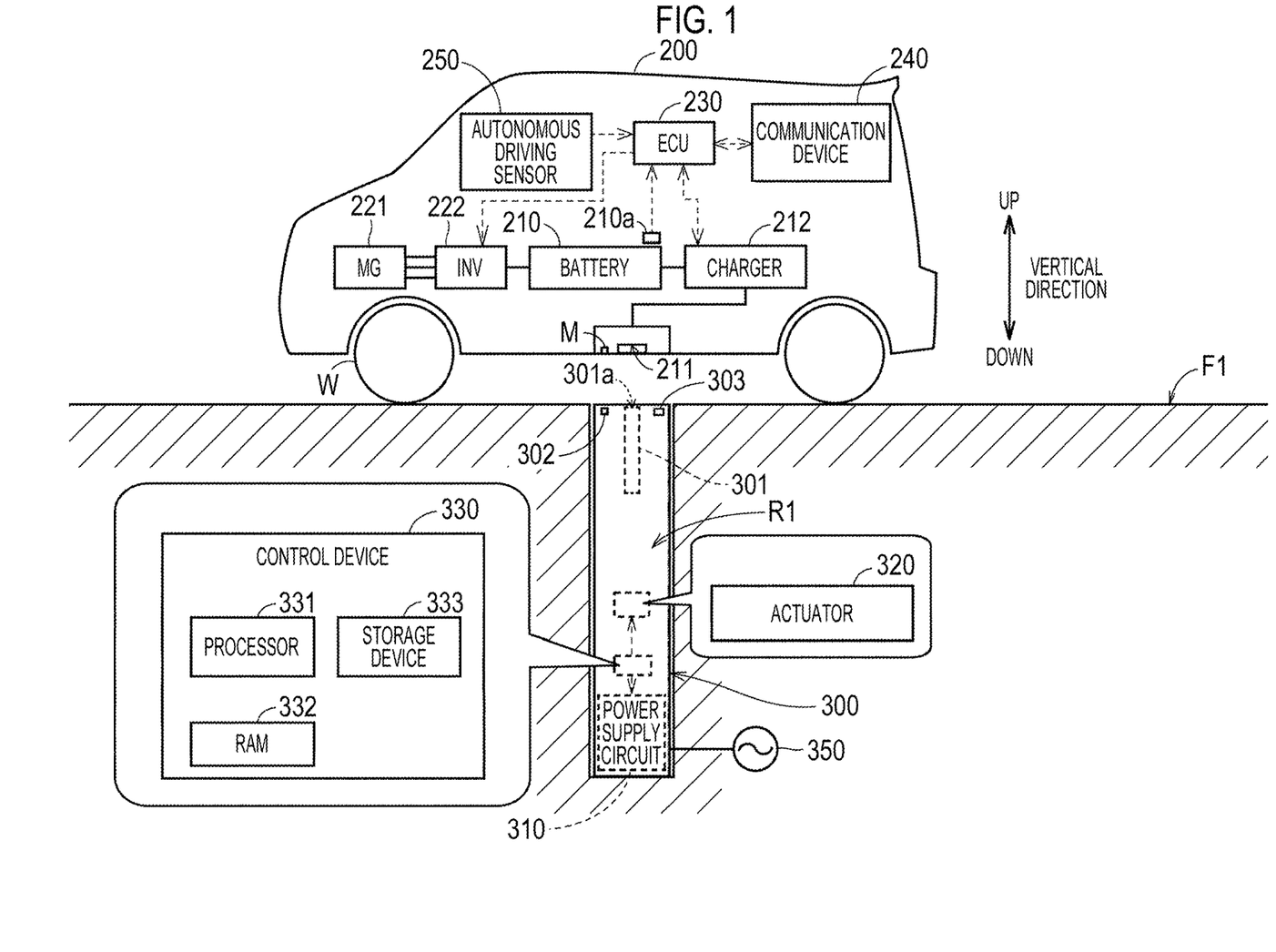
FIG. 1 is a diagram showing an example of a configuration of a charging equipment according to the present embodiment.

FIG. 1 is a diagram showing an example of a configuration of charging equipment 300 according to the present embodiment. As shown in FIG. 1, the charging equipment 300 is movable charging equipment configured to be housed under the ground F1. A state of the charging equipment 300 shown in FIG. 1 is a state in which the charging equipment 300 is housed under the ground F1 (hereinafter, also referred to as a "housed state").

The charging equipment 300 is installed in a recess portion R1 extending downward from the ground F1. In the housed state, the entire charging equipment 300 is housed inside the recess portion R1. The charging equipment 300 includes a cylindrical housing. The housing of the charging equipment 300 is fixed to a bottom surface of the recess portion R1. A material of the housing may be metal or plastic. A surface of the housing may be subjected to waterproof processing.

The charging equipment 300 includes a power supply circuit 310, an actuator 320, and a control device 330 in the housing. In addition, the charging equipment 300 further includes a movable portion 301 that can be displaced in a vertical direction (up-and-down direction). The movable portion 301 is a rod-shaped member having a connector 301a at a distal end thereof. The actuator 320 corresponds to an elevating device that elevates and lowers the movable portion 301. In the housed state, the entire movable portion 301 is housed in the housing of the charging equipment 300, and a top surface of the charging equipment 300 is flush with the ground F1. A sealing member may be provided in a gap between an outer peripheral surface of the housing of the charging equipment 300 and an inner wall of the recess portion R1.

The connector 301a of the movable portion 301 is connected to the power supply circuit 310 via an electric wire (not shown). The movable portion 301 may include a communication line connected to the control device 330, in addition to an electric power line connected to the power supply circuit 310. The power supply circuit 310 is configured to receive electric power supplied from an alternating current power supply 350 and supply the electric power to the movable portion 301 (more specifically, the connector 301a). The power supply circuit 310 includes an electric power conversion circuit and functions as a charger on charging equipment side. The alternating current power supply 350 supplies alternating current electric power to the power supply circuit 310. The alternating current power supply 350 may be a commercial power supply (for example, an electric power system provided by a power company). The power supply circuit 310 is controlled by the control device 330.

The actuator 320 is configured to directly or indirectly apply power to the movable portion 301 to cause the movable portion 301 to move in the vertical direction. The actuator 320 may be an electric actuator that generates the power by using the electric power supplied from the power supply circuit 310. A displacement mechanism of the movable portion 301 may be a rack and pinion mechanism. For example, a rack gear may be fixed to the movable portion 301, and the actuator 320 may be configured to rotationally drive a pinion gear meshed with the rack gear. Alternatively, a rod connected to a piston may be fixed to the movable portion 301, and the actuator 320 may be configured to cause the piston to hydraulically move. Alternatively, the actuator 320 may generate a magnetic force by using the electric power and directly apply the power to the movable portion 301 by using the magnetic force. The actuator 320 is controlled by the control device 330.

The control device 330 may be a computer. The control device 330 includes a processor 331, a random access memory (RAM) 332, and a storage device 333. As the processor 331, for example, a central processing unit (CPU) can be adopted. The storage device 333 is configured to store the stored information. The storage device 333 stores the information used in a program (for example, a map, a mathematical formula, and various parameters), in addition to the program. In the present embodiment, the processor 331 executes the program stored in the storage device 333 to execute various controls in the charging equipment 300. It should be noted that various controls in the charging equipment 300 are not limited to the execution by software, and can also be executed by dedicated hardware (electronic circuit). It should be noted that the number of processors provided in the control device 330 is optional, and the processor may be prepared for each predetermined control.

The method of connection between the charging equipment 300 and the vehicle is a method in which, in a state in which a vehicle 200 is parked directly above the movable portion 301 housed under the ground F1, the connector 301a of the movable portion 301 is elevated from under the floor of the vehicle 200 to the vehicle 200 and is connected to an inlet 211 provided in the lower portion of the vehicle 200. The connector 301a of the movable portion 301 is configured to be connected to the inlet 211 provided in the lower portion of the vehicle 200 parked at a predetermined parking position. A position at which the electric power is supplied to the vehicle 200 by the charging equipment 300 according to the present embodiment is a position at which the connector 301a matches the inlet 211 of the vehicle 200 in a plan view (that is, position at which X and Y coordinates of each of the connector 301a and the inlet 211 match each other). The movable portion 301 is configured to be displaced within a movable range including a first position at which the connector 301a is housed under the ground F1 and a second position at which the connector 301a is connected to the inlet 211 of the vehicle 200 above the ground F1.

Figure 2:
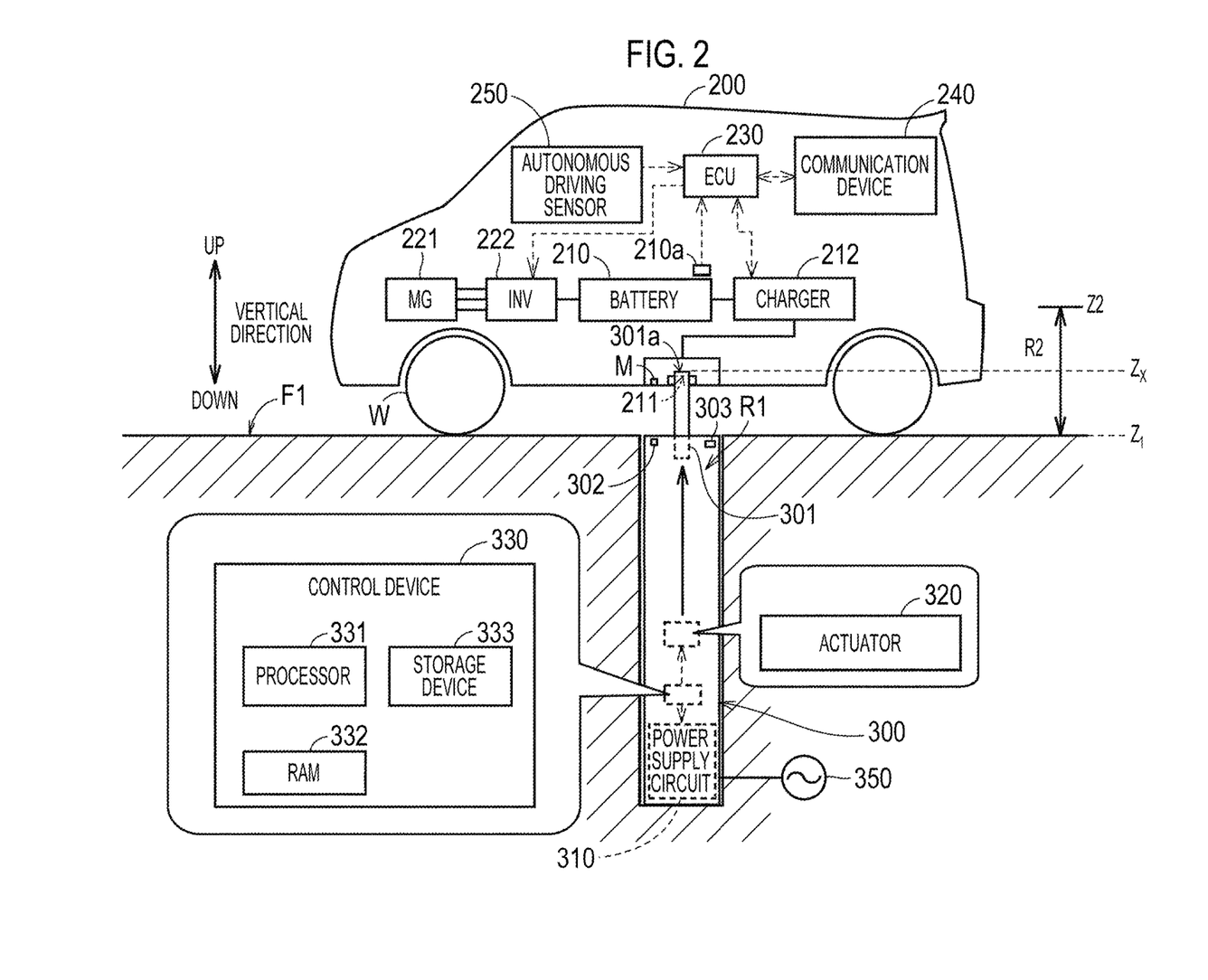
FIG. 2 is a diagram showing a state in which a movable portion is elevated.

FIG. 2 is a diagram showing a state in which the movable portion 301 is elevated. With reference to FIG. 2, the movable portion 301 is displaced (elevated and lowered) in the vertical direction such that a position Zx of the connector 301a is changed. The state of the charging equipment 300 shown in FIG. 2 is a state in which the movable portion 301 is elevated to the position (second position) at which the connector 301a is connected to the inlet 211 of the vehicle 200 (hereinafter, also referred to as an "elevated state"). In the following, for convenience of description, the position Zx of the connector 301a of the movable portion 301 is regarded as the position of the movable portion 301.

The movable portion 301 is configured to be displaced within a movable range R2. A lower limit position Z1 of the movable range R2 has the same height as the ground F1. In a case where the position of the movable portion 301 is the lower limit position Z1, the entire movable portion 301 (including the connector 301a) is housed under the ground F1 (see FIG. 1). In a case where the position of the movable portion 301 is higher than the lower limit position Z1, the connector 301a is exposed above the ground F1. An upper limit position Z2 of the movable range R2 is set to a position sufficiently higher than the height of the inlet 211 of the vehicle 200. The movable range R2 includes the first position (for example, the lower limit position Z1) at which the connector 301a is housed under the ground and the second position (for example, the position Zx shown in FIG. 2) at which the connector 301a is connected to the inlet 211 of the vehicle 200 above the ground. In the present embodiment, the lower limit position Z1 is the same position as the ground F1, but the lower limit position Z1 may be set to a position lower than the ground F1.

Figure 3:
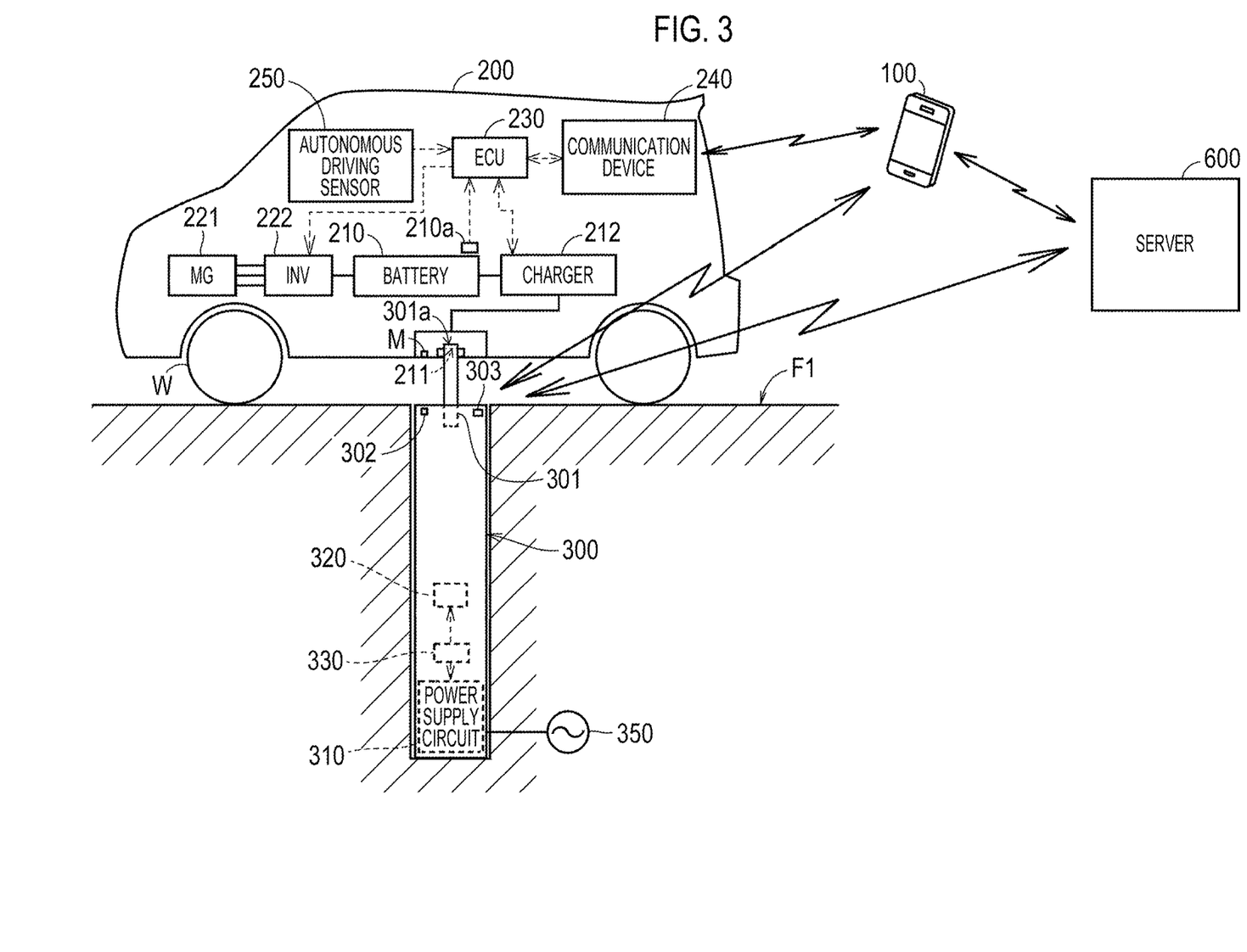
FIG. 3 is a diagram for describing communication executed in the charging equipment.

FIG. 3 is a diagram for describing communication executed in the charging equipment 300. As shown in FIG. 3, the charging equipment 300 further includes a parking sensor 302 and a communication device 303.

The parking sensor 302 is a sensor that acquires positional deviation information indicating a relative positional relationship (for example, a direction and a distance of the positional deviation) between the inlet 211 of the vehicle 200 and the connector 301a. The parking sensor 302 may acquire the positional deviation information by recognizing a mark M provided in the vicinity of the inlet 211 of the vehicle 200, for example. The parking sensor 302 may include at least one of a laser and a camera. A detection result of the parking sensor 302 is output to the control device 330. The control device 330 can determine whether or not the vehicle 200 is parked in the predetermined parking position by using the detection result of the parking sensor 302. For example, in a case where a stationary state of the vehicle 200 continues until a predetermined time elapses after the parking sensor 302 detects that the vehicle 200 is stopped at the predetermined parking position, the control device 330 may determine that the vehicle 200 is parked at the predetermined parking position.

The communication device 303 is configured to execute wireless communication with each of a server 600 and a portable terminal 100. The communication device 303 transmits the information received from an outside of the charging equipment 300 to the control device 330. The control device 330 sequentially transmits the state of the charging equipment 300 to the server 600 via the communication device 303.

The portable terminal 100 corresponds to a portable terminal carried by a user of the vehicle 200. The portable terminal 100 includes a built-in computer. In the present embodiment, a smartphone equipped with a touch panel display is adopted as the portable terminal 100. It should be noted that the present disclosure is not limited to this, and any portable terminal can be adopted as the portable terminal 100, and a tablet terminal, a wearable device (for example, a smartwatch), an electronic key, or the like can also be adopted.

The portable terminal 100 is configured to execute wireless communication with each of the charging equipment 300 and the server 600. Predetermined application software (in the following, simply referred to as "application") is installed in the portable terminal 100. The portable terminal 100 is carried by the user of the vehicle 200, and can exchange the information with each of the charging equipment 300 and the server 600 via the application. The user can operate the application via, for example, the touch panel display of the portable terminal 100. In addition, the touch panel display of the portable terminal 100 is configured to notify the user of the vehicle 200 of the information.

In the present embodiment, in a case where the user activates the application of the portable terminal 100 and succeeds in the user authentication to the server 600, the user can execute an operation of reserving the user of the charging equipment 300 around a destination on the application. In the present embodiment, the portable terminal 100 is configured to transmit the information on a desired time zone and a destination to the server 600 in response to a request from the user. The user can input the information on the desired time zone and the destination to be reserved to the portable terminal 100 via the touch panel display.

In a case where the user executes the operation of reserving the use of the charging equipment 300 around the destination in the time zone desired by the user, the server 600 sets any charging equipment 300 among a plurality of pieces of charging equipment around the destination as the charging equipment that is a reservation target.

The vehicle 200 shown in FIGS. 1 to 3 is an electrified vehicle including a battery 210, a device (for example, a motor generator 221 and an inverter 222 to be described below) for traveling using the electric power stored in the battery 210, and a device (for example, the inlet 211 and a charger 212 to be described below) for charging the battery 210 by using the charging equipment 300. The vehicle 200 according to the present embodiment is an electric vehicle (EV) without an engine (internal combustion engine).

The vehicle 200 further includes an electronic control unit (hereinafter referred to as "ECU") 230 and a communication device 240. The ECU 230 may be a computer. The ECU 230 includes a processor, a RAM, and a storage device (none of which is shown). Various vehicle controls are executed by executing the program stored in the storage device by the processor. It should be noted that the vehicle controls in the server 30 are not limited to the execution by software, and can also be executed by dedicated hardware (electronic circuit).

The ECU 230 is configured to execute communication with the outside of the vehicle 200 via the communication device 240. The communication device 240 includes various communication interfaces (I/Fs). The communication device 240 may include a communication I/F that executes wireless communication with the server 600 (FIG. 3). In addition, the communication device 240 mounted on the vehicle 200 and the portable terminal 100 are configured to execute wireless communication with each other. The ECU 230 can control the portable terminal 100 by wireless communication to cause the portable terminal 100 to give a notification to the user. The communication between the communication device 240 and the portable terminal 100 may be short-range communication (for example, direct communication in the vehicle and around the vehicle).

For example, the battery 210 includes a secondary battery, such as a lithium ion battery or a nickel metal hydride battery. The secondary battery may be an assembled battery or an all-solid-state battery. It should be noted that another power storage device, such as an electric double layer capacitor, may be adopted instead of the secondary battery.

The vehicle 200 further includes a monitoring module 210a that monitors a state of the battery 210. The monitoring module 210a includes various sensors that detect the state of the battery 210 (for example, a voltage, a current, and a temperature), and outputs the detection result to the ECU 230. The monitoring module 210a may be a battery management system (BMS) further having a state-of-charge (SOC) estimation function, a state-of-health (SOH) estimation function, a cell voltage equalization function, a diagnosis function, and a communication function, in addition to the sensor function. The ECU 230 can acquire the state of the battery 210 (for example, the temperature, the current, the voltage, the SOC, and an internal resistance) based on the output of the monitoring module 210a.

The vehicle 200 includes the motor generator (hereinafter referred to as "MG") 221 and the inverter (hereinafter referred to as "INV") 222 for electric traveling. For example, the MG 221 is a three-phase alternating current motor generator. The MG 221 is driven by the INV 222 and is configured to rotate drive wheels W of the vehicle 200. The INV 222 is controlled by the ECU 230. The INV 222 drives the MG 221 by using the electric power supplied from the battery 210. In addition, the MG 221 executes regenerative electric power generation, and supplies the generated electric power to the battery 210 via the INV 222. It should be noted that a drive method of the vehicle 200 is not limited to front wheel driving shown in FIGS. 1 to 3, and may be rear wheel driving or four-wheel driving.

The vehicle 200 is configured to execute autonomous driving. The vehicle 200 further includes an autonomous driving sensor 250. The autonomous driving sensor 250 is a sensor used for autonomous driving. It should be noted that the autonomous driving sensor 250 may be used with a predetermined control when the autonomous driving is not executed.

The autonomous driving sensor 250 includes a sensor that acquires information for recognizing an external environment of the vehicle 200 and a sensor that acquires information on the position and posture of the vehicle 200. The autonomous driving sensor 250 may include, for example, at least one of a camera, a millimeter wave radar, and a LiDAR. The autonomous driving sensor 250 may include, for example, at least one of an inertial measurement unit (IMU) and a global positioning system (GPS) sensor. The ECU 230 is configured to execute autonomous driving of the vehicle 200 by controlling an accelerator device, a brake device, and a steering device (none of which is shown) of the vehicle 200 by using various pieces of information acquired by the autonomous driving sensor 250.

The vehicle 200 includes the inlet 211 for contact charging and the charger 212. The inlet 211 is provided in the lower portion of the vehicle 200 (for example, in the vicinity of a floor panel). The mark M for position detection is provided in the vicinity of the inlet 211. In addition, although not shown, the vehicle 200 includes a circuit that detects the connection state of the inlet 211 (for example, a circuit that detects whether or not the connector 301a is connected to the inlet 211).

The inlet 211 is configured to be connected to the connector 301a of the charging equipment 300. Both the inlet 211 and the connector 301a have built-in contacts, and in a case where the connector 301a is connected to the inlet 211, the contacts come into contact with each other, and the inlet 211 and the connector 301a are electrically connected. In the following, a state in which the connector 301a is connected to the inlet 211 (that is, a state in which the charging equipment 300 and the vehicle 200 are electrically connected) is referred to as a "plug-in state". In addition, a state in which the connector 301a is not connected to the inlet 211 (that is, a state in which the charging equipment 300 and the vehicle 200 are not electrically connected) is referred to as a "plug-out state".

The charger 212 includes an electric power conversion circuit (not shown). The electric power conversion circuit converts the electric power supplied to the inlet 211 from the outside of the vehicle into the electric power suitable for charging the battery 210. For example, in a case where the alternating current electric power is supplied from the inlet 211, the charger 212 converts the supplied alternating current electric power into direct current electric power and supplies the converted direct current electric power to the battery 210. The charger 212 is controlled by the ECU 230.

The server 600 shown in FIG. 3 includes a control device, a storage device, and a communication device (none of which is shown). The server 600 may be a computer. The control device includes a processor and is configured to execute predetermined information processing. The storage device is configured to store various pieces of information. The communication device includes various communication I/Fs. In the server 600, the control device is configured to execute communication with the outside via the communication device. The server 600 is configured to execute communication with each of the portable terminal 100 and the charging equipment 300. In addition, the server 600 may be configured to execute communication with the vehicle 200 via the charging equipment 300 while the battery 210 is charged.

A plurality of vehicles (including the vehicle 200), a plurality of users (including the user of the vehicle 200), and the pieces of charging equipment (including the charging equipment 300) are registered in the server 600. In addition, a user terminal (including the portable terminal 100) is also registered in the server 600 together with the user. The server 600 is configured to manage information on each registered user (hereinafter, also referred to as "user information"), information on each registered vehicle (hereinafter, also referred to as "vehicle information"), and information on each registered charging equipment (hereinafter, also referred to as "charging equipment information"). Information on the user terminal is included in at least one of the user information and the vehicle information. The user information, the vehicle information, and the charging equipment information are stored in the storage device of the server 600.

Identification information (user ID) for identifying the user is assigned to each user, and the server 600 manages the user information separately by the user ID. The user ID also functions as information for identifying the user terminal (terminal ID). The user information includes, for example, communication address and positional information of the portable terminal carried by the user, and information (vehicle ID) for identifying the vehicle belonging to the user. In addition, the identification information (vehicle ID) for identifying the vehicle is assigned to each vehicle, and the server 600 manages the vehicle information separately by the vehicle ID. The vehicle information includes, for example, a vehicle specification (for example, charging specification) and information received by the server 600 from the user terminal (for example, vehicle travel plan). Further, identification information (EVSE-ID) for identifying the charging equipment is assigned to each charging equipment, and the server 600 manages the charging equipment information separately by the EVSE-ID. The charging equipment information includes the position of the charging equipment, the connection state of the charging equipment (plug-in state/plug-out state), the combination of the charging equipment in the plug-in state and the vehicle (vehicle ID and EVSE-ID), and a power supply state of the EVSE (during power supply/power supply stopped).

In a case where the charging equipment 300 having the configuration described above is not in use, the charging equipment 300 is put into the housed state (for example, the state shown in FIG. 1), so that it is possible for the charging equipment 300 not to deteriorate the scenery even when the charging equipment 300 is installed in the city.

Such charging equipment 300 can be used by, for example, making a reservation in advance using the portable terminal 100 or the like and causing the vehicle 200 to move to the predetermined parking position of the charging equipment 300 reserved by the user.

For example, in a case where the operation of reserving the user of the charging equipment 300 in the vicinity of the destination in the time zone desired by the user on the application as described above, the server 600 sets the any charging equipment 300 that can receive the reservation at the time zone desired by the user (other reservation are not made) among the pieces of charging equipment in the vicinity of the destination, as the charging equipment that is the reservation target. The server 600 transmits the reservation information on the desired time zone, the user ID, and the vehicle ID of the vehicle 200 (hereinafter, referred to as target vehicle) that is the usage target of the charging equipment 300 to the charging equipment 300 set as the reservation target. In addition, the server 600 stores the reservation information, the user ID, the vehicle ID, and the EVSE-ID in the storage device in association with each other.

The user causes the target vehicle to move to the predetermined parking position of the charging equipment 300 that is the reservation target. In this case, the user may cause the target vehicle to move to the predetermined parking position by autonomous driving (autonomous parking), or may cause the target vehicle to move to the predetermined parking position by manual driving (driving by the user him/herself). For example, the ECU 230 that is the target vehicle transmits the positional information of the target vehicle acquired by the autonomous driving sensor 250 while moving to the charging equipment 300 set as the reservation target via the server 600 at predetermined time intervals.

In a case where the target vehicle is parked at the predetermined parking position in the time zone desired by the user, the control device 330 of the charging equipment 300 set as the reservation target operates the actuator 320 and elevates the movable portion 301 to the second position. In this case, for example, the control device 330 acquires the vehicle ID from the target vehicle, and elevates the movable portion 301 when the acquired vehicle ID matches the vehicle ID received from the server 600.

In a case where the movable portion 301 is elevated to the second position by the control device 330, the connector 301a is connected to the inlet 211 of the target vehicle, and is put into the plug-in state. The control device 330 operates the power supply circuit 310 to supply the alternating current electric power to the target vehicle. In the target vehicle, the battery 210 mounted on the vehicle is charged by using the supplied alternating current electric power.

However, for example, in a case where a vehicle (hereinafter, referred to as non-target vehicle) that is not the usage target of the charging equipment 300 set as the reservation target is parked at the predetermined parking position before the target vehicle moves to the predetermined parking position, there is a possibility that the target vehicle cannot move to the parking position and the battery 210 mounted on the target vehicle cannot be charged. Therefore, there is a possibility that the convenience of the user is deteriorated.

Therefore, in the present embodiment, the control device 330 of the charging equipment 300 elevates the movable portion 301 from the first position in a case where the non-target vehicle approaches the charging equipment 300.

As described above, it is possible to suppress parking of the non-target vehicle at the predetermined parking position. Therefore, it is possible to avoid a situation in which the target vehicle cannot be parked at the predetermined parking position, so that it is possible to suppress the deterioration of the convenience of the user.

Figure 4:
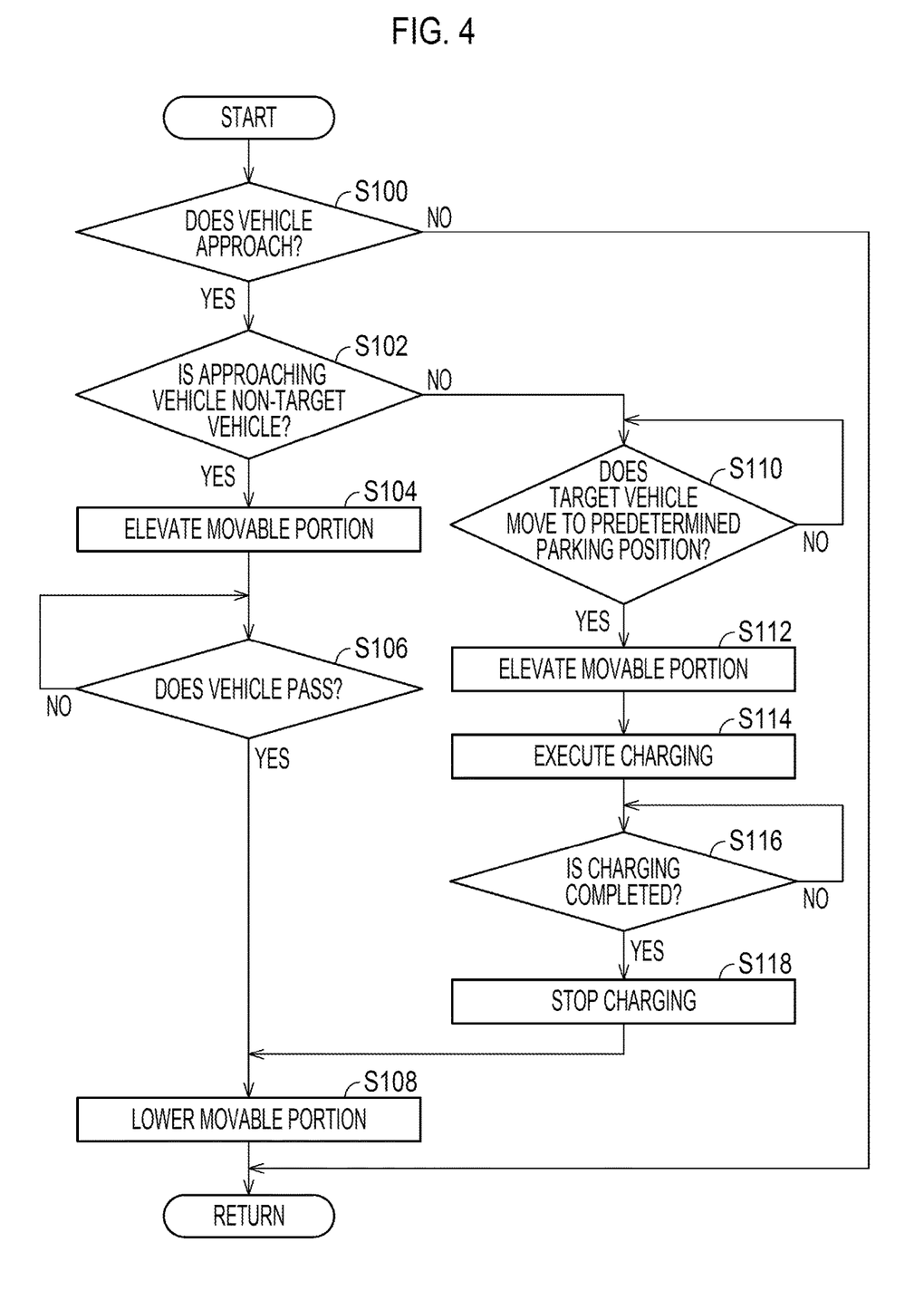
FIG. 4 is a flowchart showing an example of a process executed by a control device of the charging equipment.

In the following, an example of a process executed by the control device 330 of the charging equipment 300 will be described with reference to FIG. 4. FIG. 4 is a flowchart showing an example of the process executed by the control device 330 of the charging equipment 300.

In step (hereinafter, step is referred to as S) 100, the control device 330 determines whether or not the vehicle approaches the charging equipment 300. The control device 330 may determine whether or not the vehicle approaches the charging equipment 300 by, for example, using an image captured by a camera that images the surroundings of the charging equipment 300. For example, the control device 330 may analyze the captured image and determine that the vehicle approaches the charging equipment 300 when the image includes an image of the moving vehicle. As for the extraction of the image of the vehicle by the image analysis, a well-known technique need only be used and the detailed description will not be given. The camera may be installed outside the charging equipment 300, or may be installed at an upper end of the charging equipment 300. In a case where a determination is made that the vehicle approaches the charging equipment 300 (YES in S100), the process proceeds to S102.

In S102, the control device 330 determines whether or not the approaching vehicle is the non-target vehicle. The control device 330 may determine that the approaching vehicle is the non-target vehicle, for example, in a case where the vehicle ID cannot be acquired from the approaching vehicle.

Alternatively, in the control device 330 may determine that the approaching vehicle is the non-target vehicle, for example, in a case where the vehicle ID acquired from the approaching vehicle is different from the vehicle ID received from the server 600 as the vehicle reserved to use the charging equipment 300. Alternatively, the control device 330 determines that the vehicle is the non-target vehicle, for example, in a case where the position of the target vehicle does not match the position of the approaching vehicle. The control device 330 may determine that the position of the target vehicle does not match the position of the approaching vehicle, for example, in a case where a distance between the position of the target vehicle received via the server 600 and the position of the approaching vehicle is larger than a threshold value. Alternatively, the control device 330 may determine that the position of the target vehicle does not match the position of the approaching vehicle in a case where a difference between a first distance between the position of the target vehicle received via the server 600 and the charging equipment 300, and a second distance between the approaching vehicle and the charging equipment 300 is larger than the threshold value. In a case where a determination is made that the approaching vehicle is the non-target vehicle (YES in S102), the process proceeds to S104.

In S104, the control device 330 elevates the movable portion 301 from the first position. The control device 330 elevates the movable portion 301 from the first position to a predetermined position, for example. The predetermined position is, for example, a position corresponding to a height that hinders parking of the charging equipment 300 at the predetermined parking position.

In S106, the control device 330 determines whether or not the approaching vehicle passes the charging equipment 300. The control device 330 determines whether or not the approaching vehicle passes the charging equipment 300 by using, for example, the image captured by the camera that images the surroundings of the charging equipment 300. The control device 330 may determine that the approaching vehicle passes, for example, in a case where the captured image does not include an image corresponding to the approaching vehicle. In a case where a determination is made that the approaching vehicle passes the charging equipment 300 (YES in S106), the process proceeds to S108.

In S108, the control device 330 lowers the movable portion 301 to the first position. That is, the control device 330 controls the actuator 320 such that the movable portion 301 is displaced to the first position. More specifically, the control device 330 lowers the movable portion 301 to the lower limit position Z1 of the movable range R2. It should be noted that in a case where a determination is made that the vehicle does not approach the charging equipment 300 (NO in S100), this process is terminated. In addition, in a case where a determination is made that the approaching vehicle is not the non-target vehicle (NO in S102), the process proceeds to S110. In addition, in a case where a determination is made that the approaching vehicle does not pass the charging equipment 300 (NO in S106), this process is returned to S106.

In S110, the control device 330 determines whether or not the target vehicle moves to the predetermined parking position. For example, as described above, the control device 330 determines whether or not the target vehicle is parked at the predetermined parking position by using the detection result of the parking sensor 302. Alternatively, the control device 330 may determine that the target vehicle moves to the predetermined parking position in a case where the distance between the position of the target vehicle and the predetermined parking position is smaller than the threshold value. The control device 330 may acquire the positional information of the target vehicle via the server 600, or may acquire the positional information directly from the target vehicle. In a case where a determination is made that the target vehicle moves to the predetermined parking position (YES in S110), the process proceeds to S112. It should be noted that in a case where a determination is made that the target vehicle does not move to the predetermined parking position (NO in S110), the process is returned to S110.

In S112, the control device 330 controls the actuator 320 such that the movable portion 301 is displaced from the first position to the second position. As a result, the connector 301a of the movable portion 301 is elevated from under the floor of the target vehicle to the inlet 211 of the target vehicle and is connected to the inlet 211 provided in the lower portion of the target vehicle. By this process, the charging equipment 300 is put into the elevated state (for example, the state shown in FIG. 2). In addition, the target vehicle and the charging equipment 300 are put into the plug-in state. In the plug-in state, the electric power can be exchanged between the target vehicle and the charging equipment 300.

In S114, the control device 330 executes charging. That is, the control device 330 controls the power supply circuit 310 such that the electric power supply (power supply) from the charging equipment 300 to the target vehicle is executed. By this process, the power supply to the target vehicle is started, and charging of the battery 210 mounted on the vehicle is started.

More specifically, the power supply circuit 310 of the charging equipment 300 converts (for example, transforms) the alternating current electric power supplied from the alternating current power supply 350 into the alternating current electric power suitable for the power supply to the target vehicle, and supplies the converted electric power to the connector 301a. In the plug-in state, the electric power supplied from the power supply circuit 310 to the connector 301a is input to the inlet 211 of the target vehicle. The electric power input to the inlet 211 is supplied to the battery 210 via the charger 212. While the battery 210 is charged, the control device 330 controls the power supply circuit 310 to adjust the electric power supplied to the target vehicle, and the ECU 230 controls the charger 212 to adjust the charging electric power. As described above, the battery 210 mounted on the target vehicle is charged.

In S116, the control device 330 determines whether or not charging of the battery 210 mounted on the target vehicle is completed. The control device 330 determines that charging of the battery 210 mounted on the target vehicle is completed, for example, in a case where the information indicating a stop request for the electric power supply is received from the target vehicle. Alternatively, the control device 330 may determine that charging of the battery 210 is completed, for example, in a case where the control device 330 receives the information indicating a stop request for the electric power supply from the portable terminal 100. In a case where a determination is made that charging of the battery 210 mounted on the target vehicle is completed (YES in S116), the process proceeds to S118. It should be noted that in a case where a determination is made that charging of the battery 210 mounted on the target vehicle is not completed (NO in S116), the process is returned to S116.

In S118, the control device 330 stops charging. Specifically, the control device 330 controls the power supply circuit 310 such that the electric power supply to the target vehicle is stopped. Thereafter, the control device 330 shifts the process to S108.

Figure 5:
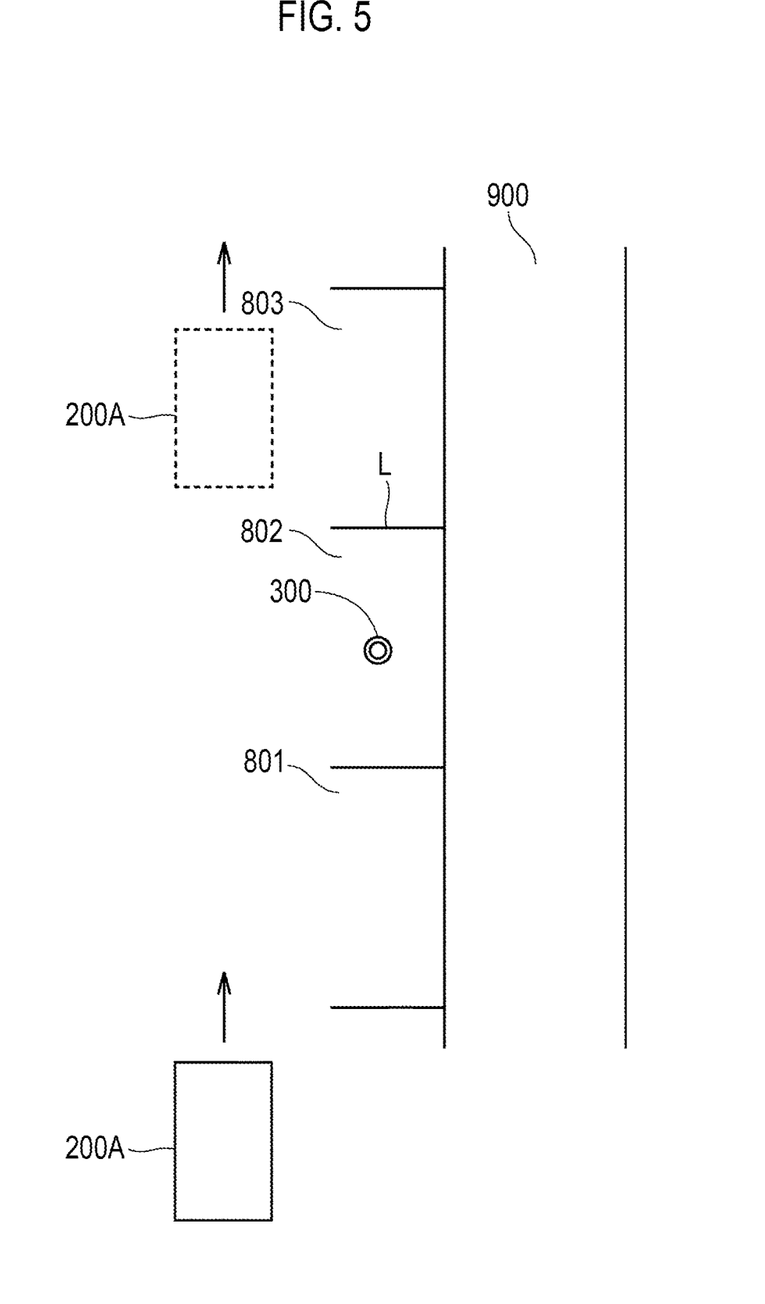
FIG. 5 is a diagram for describing an example of an operation of the control device of the charging equipment.
Figure 6:
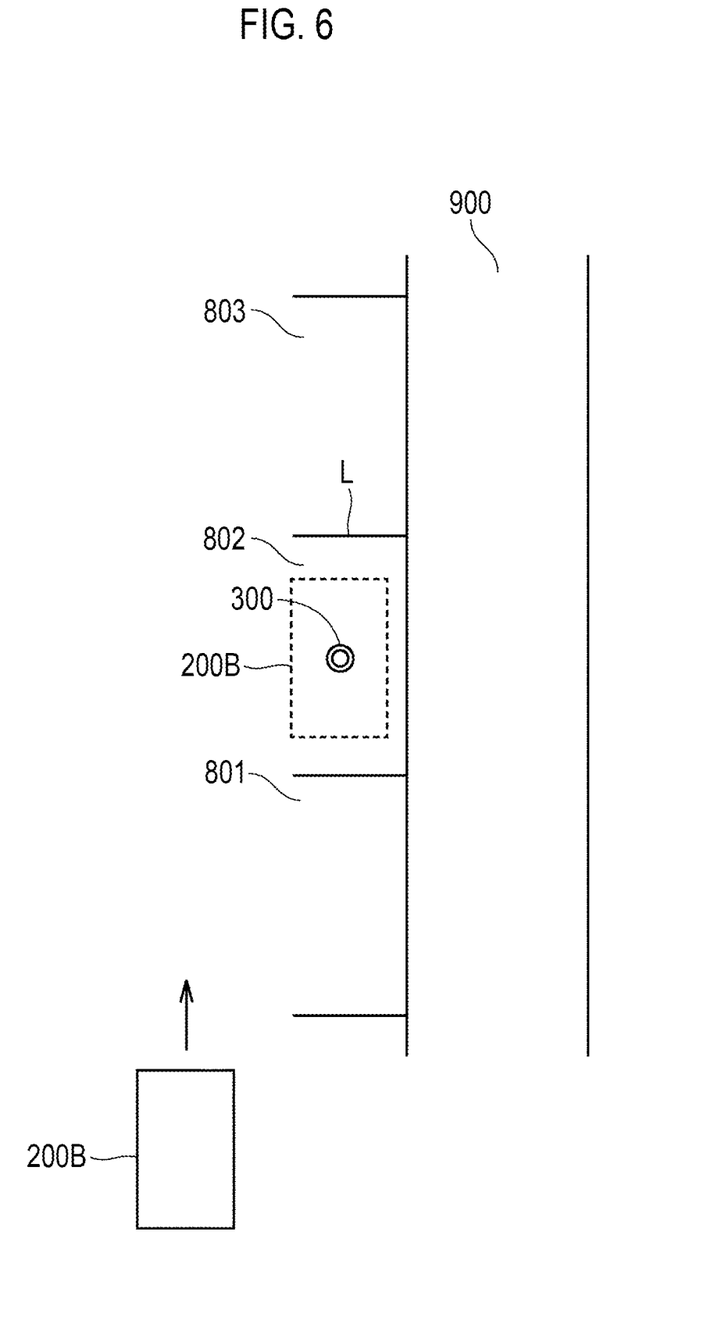
FIG. 6 is a diagram for describing another example of the operation of the control device of the charging equipment.

An operation of the control device 330 of the charging equipment 300 based on structure and the flowchart will be described with reference to FIGS. 5 and 6. FIG. 5 is a diagram for describing an example of the operation of the control device 330 of the charging equipment 300. FIG. 6 is a diagram for describing another example of the operation of the control device 330 of the charging equipment 300.

With reference to FIGS. 5 and 6, in this example, a plurality of parking spaces 801, 802, 803 is partitioned by a partition line L to be vertically arranged (column) in the parking lot. Among the parking spaces 801, 802, 803, the charging equipment 300 is installed solely in the parking space 802. Sidewalk 900 is adjacent to the parking spaces 801, 802, 803. The sidewalk 900 is provided along a longitudinal direction of each parking space.

For example, it is assumed that the non-target vehicle approaches the charging equipment 300. A solid line frame in FIG. 5 shows a state in which a non-target vehicle 200A approaches the charging equipment 300. A broken line frame in FIG. 5 shows a state in which the non-target vehicle 200A passes the charging equipment 300.

As shown in the solid line frame of FIG. 5, in a case where the vehicle approaches the charging equipment 300 (YES in S100) and the approaching vehicle is the non-target vehicle 200A (YES in S102), the movable portion 301 is elevated to the height that hinders the parking of the approaching vehicle (S104). Therefore, parking of the non-target vehicle in the parking space 802 in which the charging equipment 300 is installed is suppressed.

Moreover, as shown in the broken line frame of FIG. 5, in a case where the non-target vehicle 200A passes the charging equipment 300 (YES in S106), the actuator 320 is controlled such that the movable portion 301 is displaced to the first position. As a result, the movable portion 301 is lowered to the lower limit position Z1 of the movable range R2 (S108). Therefore, thereafter, the target vehicle that is the usage target of the charging equipment 300 can be parked in the parking space 802.

Next, it is assumed that the target vehicle approaches the charging equipment 300. A solid line frame in FIG. 6 shows a state in which a target vehicle 200B approaches the charging equipment 300. A broken line frame in FIG. 6 shows a state in which the target vehicle 200B is parked at the predetermined parking position in the parking space 802.

As shown in the solid line frame of FIG. 6, in a case where the vehicle approaches the charging equipment 300 (YES in S100) and the approaching vehicle is the target vehicle 200B (not the non-target vehicle) (NO in S102), elevating of the movable portion 301 is waited until the target vehicle 200B moves to the predetermined parking position (NO in S110). Moreover, as shown in the broken line frame of FIG. 6, in a case where the target vehicle 200B moves to the predetermined parking position (YES in S110), the movable portion 301 is elevated to the second position (S112). In a case where the movable portion 301 is elevated to the second position and the connector 301a is connected to the inlet on the lower portion of the target vehicle 200B, charging is executed (S114). In a case where the battery 210 mounted on the target vehicle 200B is put into a fully charged state and the information indicating the stop request for the electric power supply is received from the target vehicle 200B, a determination is made that charging is completed (YES in S116), and charging is stopped by controlling the power supply circuit 310 such that the electric power supply is stopped (S118).

Thereafter, the actuator 320 is controlled such that the movable portion 301 is displaced from the second position to the first position. As a result, the movable portion 301 is lowered to the lower limit position Z1 of the movable range R2 (S108). Therefore, the connector 301a of the movable portion 301 is separated from the inlet of the target vehicle 200B, and the target vehicle 200B and the charging equipment 300 are put into the plug-out state. In addition, in a case where the position of the movable portion 301 is the lower limit position Z1, the ground F1 and the connector 301a of the movable portion 301 are flush with each other. As described above, the charging equipment 300 is put into the housed state again (for example, the state shown in FIG. 1).

As described above, with the charging equipment 300 according to the present embodiment, in a case where the non-target vehicle that cannot use the charging equipment 300 (that is, is not reserved for the use) approaches the charging equipment 300, the movable portion 301 is elevated from the first position to the height that hinders the movement of the vehicle to the predetermined parking position, so that the parking of the non-target vehicle at the predetermined parking position can be suppressed. Therefore, it is possible to avoid a situation in which the target vehicle cannot be parked at the predetermined parking position, so that it is possible to suppress the deterioration of the convenience of the user. Therefore, it is possible to provide the charging equipment and the control method of the charging equipment that suppress the deterioration of the convenience of the user.

Further, in a case where the non-target vehicle passes the charging equipment 300, the movable portion 301 is lowered to the first position, so that the target vehicle that can use the charging equipment 300 (that is, is reserved for the use) thereafter can be parked at the predetermined position. Moreover, in a case where the target vehicle approaches the charging equipment 300, when the target vehicle is parked at the predetermined position, the movable portion 301 is elevated from the first position to the second position, so that it is possible to charge the battery 210 mounted on the target vehicle by connecting the connector 301a to the inlet 211.

In the following, a modification example will be described.

In the embodiment described above, the charging equipment 300 has been described as supplying alternating current electric power to the vehicle 200, but the charging equipment 300 may supply the direct current electric power to the vehicle 200. In this case, for example, the vehicle 200 may be configured without the charger 212.

Further, in the embodiment described above, the case where the housing of the charging equipment 300 has a cylindrical shape has been described as an example, but the shape of the housing is not particularly limited to the cylindrical shape as long as the housing has a shape in which elevating and lowering operations can be executed. For example, the housing of the charging equipment 300 may have a rectangular shape.

Further, in the embodiment described above, the charging equipment 300 has described as the configuration shown in FIGS. 1 to 3 as an example, but the shape and the dimension of the housing of the charging equipment 300 can be changed as appropriate. In addition, the shape and the dimension of the movable portion can be changed as appropriate.

Further, in the embodiment described above, the vehicle 200 has been described as the configurations shown in FIGS. 1 to 3 as an example, but the vehicle 200 is not limited to the EV and may be a plug-in hybrid vehicle (PHV). In addition, the vehicle 200 is not limited to an automobile, and may be a bus or a truck. The vehicle 200 may have a flight function. The vehicle 200 may be an unmanned traveling vehicle (for example, an automated guided vehicle (AGV) or an agricultural machine).

Further, in the embodiment described above, the charging equipment 300 has been described as elevating the movable portion 301 to the height that hinders the movement of the vehicle to the predetermined parking position in a case where the non-target vehicle approaches the charging equipment 300, but may elevate the movable portion 301 to at least a position corresponding to a height at which a driver of the non-target vehicle can recognize that the connector 301a is elevated. By making the driver of the non-target vehicle recognize elevating of the connector 301a, it is possible to suppress the movement of the non-target vehicle to the predetermined parking position.

Further, in the embodiment described above, the charging equipment 300 has been described as determining whether or not the vehicle approaches the charging equipment 300 by using the image captured by the camera that images the surroundings of the charging equipment 300, but the charging equipment 300 may determine whether or not the vehicle approaches the charging equipment 300 by using an image obtained by imaging the entrance and exit of the parking lot, for example, in a case where the parking space of the charging equipment 300 is installed in the parking lot in which the vehicles can be parked.

For example, the control device 330 may analyze the captured image and determine that the vehicle approaches the charging equipment 300 when the image includes an image of the vehicle that enters the parking lot.

Further, in the embodiment described above, the charging equipment 300 has been described as determining whether or not the vehicle approaches the charging equipment 300 by using the image captured by the camera that images the surroundings of the charging equipment 300, but the charging equipment 300 may determine whether or not the vehicle approaches the charging equipment 300 by using a detection result of a proximity sensor installed at a predetermined position (road surface, road, side wall of the road, or the like) on roadway around the parking space.

Further, in the embodiment described above, the charging equipment 300 has been described as determining whether or not the vehicle approaches the charging equipment 300 by using the image captured by the camera that images the surroundings of the charging equipment 300, but the charging equipment 300 may determine whether or not the vehicle approaches the charging equipment 300 by receiving the information on the vehicle approaching the charging equipment 300 from the server 600.

Further, in the embodiment described above, the control device 330 has been described as determining that the vehicle is the non-target vehicle in a case where the position of the target vehicle does not match the position of the approaching vehicle, but, for example, in a case where image information of the target vehicle can be acquired from the server 600, the control device 330 may analyze the image captured by the camera, and determine that the approaching vehicle is the non-target vehicle when the image of the target vehicle is not included in the captured image.

Further, in the embodiment described above, the determination has been described as being made as to whether the vehicle is the target vehicle or the non-target vehicle based on the presence or absence of the reservation of the use, the determination may be made whether the vehicle is the target vehicle or the non-target vehicle by determining whether or not the vehicle is registered in the server 600 as the vehicle that can be used (that is, whether or not the vehicle is the vehicle ID stored in the server 600).

Further, in the embodiment described above, as the method of connection between the charging equipment 300 and the vehicle 200, as an example, the method has been described in which, in a state in which the vehicle 200 is parked directly above the movable portion 301 housed under the ground, the connector 301a of the movable portion 301 is elevated from under the floor of the vehicle 200 to the vehicle 200 and is connected to an inlet 211 provided in the lower portion of the vehicle 200, the method of connection is not limited to such a method of connection, and may be the following method of connection. For example, the charging equipment 300 may be provided such that the movable portion 301 is positioned not directly under the vehicle 200 at the first position. Moreover, in a case where the movable portion 301 is displaced (elevated) from the first position to the second position, the movable portion 301 may be displaced diagonally upward to the space directly under the vehicle 200. In this case, in a case where the movable portion 301 is displaced to the second position, the connector 301a of the movable portion 301 is connected to the inlet 211 of the vehicle 200.

It should be noted that the modification example may be carried out by combining all or a part thereof as appropriate.

The embodiment disclosed this time should be considered to be exemplary examples and not restrictive in all respects. The scope of the present disclosure is shown by the scope of claims rather than the description of the embodiment described above, and is intended to include all changes within the meaning and scope equivalent to the scope of claims.

What is claimed is:

1. A charging equipment that is installed in a recess portion formed under ground and is configured to charge a power storage device mounted on a vehicle, wherein:
   an inlet used for charging the power storage device is provided in a lower portion of the vehicle;
   the charging equipment comprises:
   a movable portion having a connector configured to be connected to the inlet of the vehicle parked at a predetermined position,
   an elevating device configured to elevate and lower the movable portion within a movable range including a first position at which the connector is housed under the ground and a second position at which the connector is connected to the inlet above the ground, and
   a control device configured to control an operation of the elevating device;
   the control device is configured to, in a case where a non-target vehicle that is not a usage target of the charging equipment approaches the charging equipment, elevate the movable portion from the first position to a height that hinders parking of the non-target vehicle at the predetermined position.

2. The charging equipment according to claim 1, wherein the control device is configured to, in a case where a target vehicle that is the usage target of the charging equipment approaches the charging equipment, when the target vehicle is parked at the predetermined position, elevate the movable portion from the first position to the second position.

3. The charging equipment according to claim 1, wherein the control device is configured to, in a case where the non-target vehicle passes the charging equipment, lower the movable portion to the first position.

4. A control method of a charging equipment that is installed in a recess portion formed under ground and is configured to charge a power storage device mounted on a vehicle, wherein:

an inlet used for charging the power storage device is provided in a lower portion of the vehicle;

the charging equipment includes;

a movable portion having a connector configured to be connected to the inlet of the vehicle parked at a predetermined position, and an elevating device configured to elevate and lower the movable portion within a movable range including a first position at which the connector is housed under the ground and a second position at which the connector is connected to the inlet above the ground; and the control method comprises;

determining whether or not a non-target vehicle that is not a usage target of the charging equipment approaches the charging equipment, and in a case where the non-target vehicle approaches the charging equipment, elevating the movable portion from the first position to a height that hinders parking of the non-target vehicle at the predetermined position.

\* \* \* \* \*